(12) United States Patent
Jennings (10) Patent No.: US 10,577,970 B2
(45) Date of Patent: Mar. 3, 2020

(54) TURBINE ASSEMBLY WITH CERAMIC MATRIX COMPOSITE BLADE TRACK AND ACTIVELY COOLED METALLIC CARRIER

(71) Applicant: Rolls-Royce North American Technologies, Inc., Indianapolis, IN (US)

(72) Inventor: Aaron P. Jennings, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 868 days.

(21) Appl. No.: 15/264,280

(22) Filed: Sep. 13, 2016

(65) Prior Publication Data

US 2018/0073391 A1 Mar. 15, 2018

(51) Int. Cl.
*F01D 25/14* (2006.01)
*F01D 11/10* (2006.01)
*F01D 11/08* (2006.01)

(52) U.S. Cl.
CPC .............. *F01D 25/14* (2013.01); *F01D 11/08* (2013.01); *F01D 11/10* (2013.01); *F01D 25/145* (2013.01); *F05D 2240/11* (2013.01); *F05D 2300/6033* (2013.01); *Y02T 50/672* (2013.01); *Y02T 50/675* (2013.01)

(58) Field of Classification Search
CPC ........ F01D 25/14; F01D 25/145; F01D 11/08; F01D 11/10; F05D 2240/11; F05D 2300/6033
See application file for complete search history.

(56) References Cited

U.S. PATENT DOCUMENTS

| | | | |
|---|---|---|---|
| 6,702,550 B2 * | 3/2004 | Darkins, Jr. | F01D 9/04 415/116 |
| 6,733,235 B2 | 5/2004 | Alford et al. | |
| 6,942,445 B2 * | 9/2005 | Morris | F01D 9/04 415/1 |
| 7,052,235 B2 | 5/2006 | Alford et al. | |
| 7,604,453 B2 * | 10/2009 | Lee | F01D 5/143 415/1 |
| 8,118,546 B2 | 2/2012 | Morrison | |
| 8,246,299 B2 | 8/2012 | Razzell et al. | |
| 8,444,372 B2 * | 5/2013 | Suthar | F01D 25/12 415/1 |
| 8,647,055 B2 | 2/2014 | Foster et al. | |
| 8,721,257 B2 * | 5/2014 | Lewis | F01D 11/24 415/1 |
| 8,753,073 B2 | 6/2014 | Albers et al. | |
| 9,175,579 B2 | 11/2015 | Franks et al. | |
| 9,506,369 B2 * | 11/2016 | Boswell | F01D 11/24 |

* cited by examiner

*Primary Examiner* — Brian P Wolcott
(74) *Attorney, Agent, or Firm* — Barnes & Thornburg LLP (57) ABSTRACT

A turbine assembly for a gas turbine engine is disclosed herein. The turbine assembly includes a source of cooling air and a turbine shroud configured to extend around blades of a turbine stage and resist gasses from passing the blades without interaction with the blades. The turbine shroud includes a carrier segment comprising metallic materials and a blade track segment comprising ceramic matrix composite materials.

20 Claims, 3 Drawing Sheets

TURBINE ASSEMBLY WITH CERAMIC MATRIX COMPOSITE BLADE TRACK AND ACTIVELY COOLED METALLIC CARRIER

FIELD OF THE DISCLOSURE

The present disclosure relates generally to gas turbine engines, and more specifically to turbine assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures and high pressures from products of the combustion reaction in the combustor. Such shrouds sometimes include components made from materials having allowable temperatures that may constrain exposure of the components to the high temperature and high pressure combustion products. To maintain the temperatures of those components below their allowable temperatures, cooling of those components may be desirable. Cooling those components while minimizing the impact that such cooling has on engine performance remains an area of interest.

SUMMARY

The present disclosure may comprise one or more of the following features and combinations thereof.

According to the present disclosure, a turbine assembly for a gas turbine engine can include a source of cooling air, and a turbine shroud configured to extend around blades of a turbine stage and resist gasses from passing the blades without interaction with the blades.

In illustrative embodiments, the turbine shroud may include a carrier segment comprising metallic materials and a blade track segment comprising ceramic matrix composite materials and coupled to the carrier segment. The carrier segment may be fluidly coupled to the source of cooling air. The carrier segment may be formed to include a plurality of cooling air passageways configured to conduct cooling air provided by the source of cooling air therethrough to cool the carrier segment during operation of the turbine assembly.

In illustrative embodiments, the plurality of cooling air passageways can be shaped to discharge cooling air along a leak path into at least one mixing chamber defined between the carrier segment and the blade track segment to mix the cooling air with relatively hot gasses migrating radially outward from a gas path during operation of the turbine assembly. The leak path may extend from the gas path between the carrier segment and the blade track segment into the at least one mixing chamber. The gas path is defined in part by a radially-innermost surface of the blade track segment.

In illustrative embodiments, the source of cooling air may be configured to provide cooling air to the at least one mixing chamber such that the at least one mixing chamber is pressurized to a first pressure not greater than a second pressure of the relatively hot gasses passed along the gas path during operation of the turbine assembly. In some embodiments, the first pressure may be generally equal to the second pressure.

In illustrative embodiments, no sealing components are arranged between the carrier segment and the blade track segment. In some embodiments, an environmental barrier coating may be applied to surfaces of the carrier segment defining the plurality of cooling air passageways.

In illustrative embodiments, at least one of the plurality of cooling air passageways may be shaped to discharge cooling air along the leak path through an orifice at a location adjacent to a forward end of the blade track segment and the at least one mixing chamber is arranged aft of the orifice. The carrier segment may include a main body and brackets extending radially inward from the main body and formed to include the at least one of the plurality of cooling air passageways. The blade track segment may include a runner and hangers extending radially outward from the runner and engaged with the brackets. The orifice may be located axially between a forward-most hanger of the blade track segment and a forward-most surface of the runner.

In illustrative embodiments, the orifice may be spaced along the central axis from a channel defined between the hangers of the blade track segment. A first flow discourager may be positioned between the brackets of the carrier segment and the forward-most hanger of the blade track segment to control migration of the relatively hot gasses from the gas path between the carrier segment and the blade track segment along the leak path during operation of the turbine assembly. At least one locating pad may be positioned between the forward-most hanger of the blade track segment and the main body of the carrier segment to locate the carrier segment relative to the blade track segment during operation of the turbine assembly.

According to another aspect of the present disclosure, a turbine assembly for a gas turbine engine may include a source of cooling air and a turbine shroud. The turbine shroud can be configured to extend around blades of a turbine stage and resist gasses from passing the blades without interaction with the blades.

In illustrative embodiments, the turbine shroud may include a carrier segment comprising metallic materials and a blade track segment comprising ceramic matrix composite materials. The carrier segment may be fluidly coupled to the source of cooling air. The carrier segment may include a main body and brackets extending radially inward from the main body. The brackets may have a plurality of cooling air passageways configured to conduct cooling air provided by the source of cooling air therethrough to cool the carrier segment during operation of the turbine assembly. The blade track segment may include a runner having a radially-innermost surface and hangers extending radially outward from the runner that are engaged with the brackets of the carrier segment.

In illustrative embodiments, the plurality of cooling air passageways may be shaped to discharge cooling air along a leak path into at least one mixing chamber defined between the carrier segment and the blade track segment to mix the cooling air with relatively hot gasses migrating radially outward from a gas path during operation of the turbine assembly. The leak path may extend from the gas path between the carrier segment and the blade track segment into the at least one mixing chamber. The gas path is illustratively defined in part by the radially-innermost surface of the blade track segment.

In illustrative embodiments, the source of cooling air may be configured to provide cooling air to the at least one mixing chamber such that the at least one mixing chamber is pressurized to a first pressure not greater than a second pressure of the relatively hot gasses passed along the gas path during operation of the turbine assembly.

In illustrative embodiments, the plurality of cooling air passageways includes two cooling air passageways extending through the brackets. One of the plurality of cooling air passageways may be shaped to discharge cooling air along the leak path through a first orifice adjacent to a forward end of the runner and the at least one mixing chamber is arranged aft of the first orifice. Another of the plurality of cooling air passageways may be shaped to discharge cooling air along the leak path through a second orifice adjacent to an aft end of the runner and the at least one mixing chamber is arranged forward of the second orifice.

According to yet another aspect of the present disclosure, a turbine assembly for a gas turbine engine may include a source of cooling air and a turbine shroud. The turbine shroud may be configured to extend around blades of a turbine stage and resist gasses from passing the blades without interaction with the blades.

In illustrative embodiments, the turbine shroud may include a carrier segment comprising metallic materials and a blade track segment comprising ceramic matrix composite materials. The carrier segment may be fluidly coupled to the source of cooling air. The carrier segment may include a main body and flanges extending radially outward from the main body that are configured to couple to a case. The main body may have at least one cooling air passageway configured to conduct cooling air provided by the source of cooling air therethrough to cool the carrier segment during operation of the turbine assembly.

In illustrative embodiments, the blade track segment may have a C-shaped cross section and defining a channel. The blade track segment may be engaged with the main body of the carrier segment such that the main body is received by the channel.

In illustrative embodiments, the at least one cooling air passageway is shaped to discharge cooling air into only one mixing chamber defined between the carrier segment and the blade track segment to mix the cooling air with relatively hot gasses migrating radially outward from a gas path along a leak path during operation of the turbine assembly. The leak path may extend from the gas path between the carrier segment and the blade track segment into the only one mixing chamber. The gas path is illustratively defined in part by a radially-innermost surface of the blade track segment.

In illustrative embodiments, the source of cooling air may be configured to provide cooling air to the mixing chamber such that the mixing chamber is pressurized to a first pressure not greater than a second pressure of the relatively hot gasses passed along the gas path during operation of the turbine assembly.

In illustrative embodiments, the main body of the carrier segment has an outer surface, an inner surface arranged radially inward of the outer surface, a plenum defined between the outer and inner surfaces. In some embodiments, at least one input port may fluidly couple the outer surface to the plenum. In some embodiments, a plurality of outlet ports may fluidly couple the inner surface to the plenum. The at least one input port, the plenum, and at least one of the outlet ports may cooperatively provide the at least one cooling air passageway.

In illustrative embodiments, the mixing chamber may be defined in the channel between the blade track segment and the main body of the carrier segment.

These and other features of the present disclosure will become more apparent from the following description of the illustrative embodiments.

BRIEF DESCRIPTION OF THE DRAWINGS

FIG. 4 is a partial side elevation view of another turbine assembly adapted for use in the turbine section of FIG. 1 showing that the turbine assembly includes a turbine shroud coupled to a source of cooling air, the turbine shroud has a carrier segment fluidly coupled to the source of cooling air and a ceramic matrix composite blade track segment coupled to the carrier segment, and the carrier segment includes at least one cooling air passageway configured to conduct cooling air from the source of cooling air therethrough and shaped to discharge cooling air into a mixing chamber defined radially between the carrier segment and the blade track segment to mix the cooling air with relatively hot gasses migrating radially outward from a gas path along a leak path during operation of the turbine assembly.

DETAILED DESCRIPTION

For the purposes of promoting an understanding of the principles of the disclosure, reference will now be made to a number of illustrative embodiments illustrated in the drawings and specific language will be used to describe the same.

Figure 1:
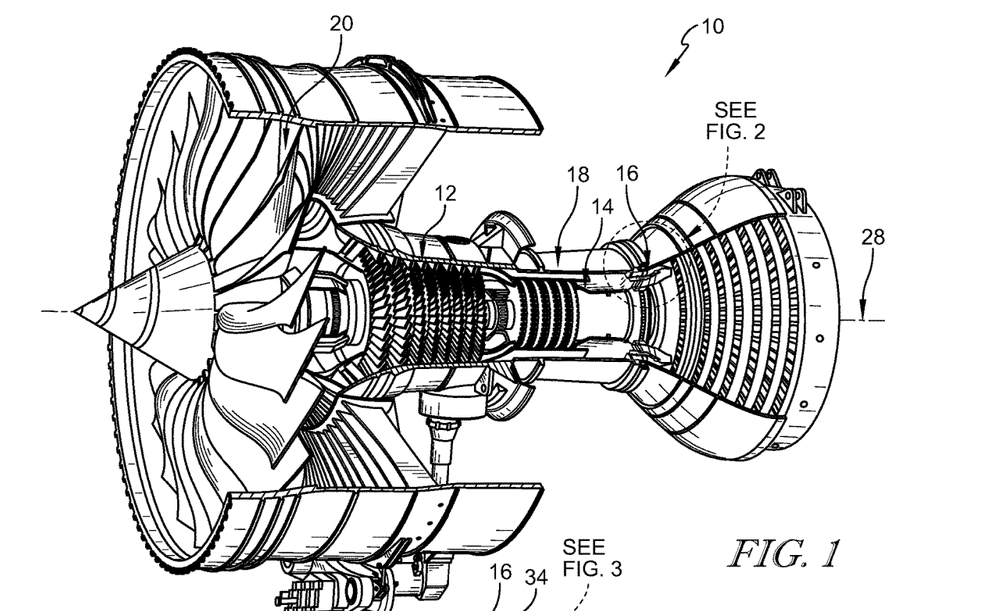
FIG. 1 is a cut-away perspective view of a gas turbine engine showing that the gas turbine engine includes a turbine section.

Referring now to FIG. 1, an illustrative gas turbine engine 10 includes a compressor 12, a combustor 14, and a turbine 16 mounted to and supported by a case 18. The compressor 12 compresses and delivers air to the combustor 14. The combustor 14 mixes fuel with the compressed air received from the compressor 12 and ignites the air-fuel mixture. The hot, high-pressure products of the combustion reaction in the combustor 14 are directed into the turbine 16 and the turbine 16 extracts work to drive the compressor 12 and a fan 20 included in the engine 10.

Figure 2:
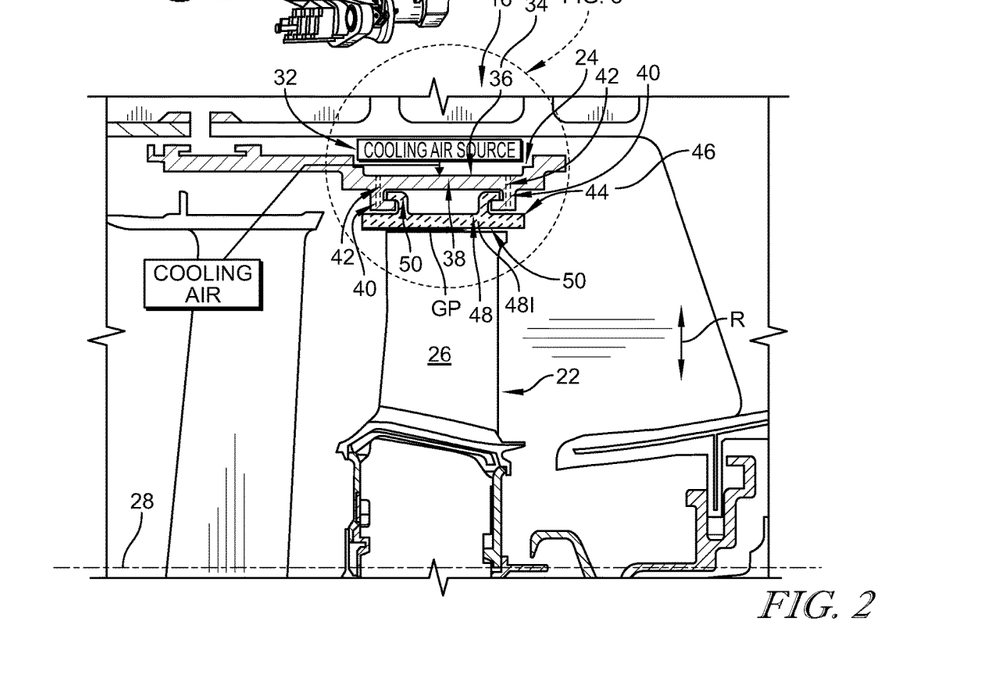
FIG. 2 is a partial cross-sectional view of the turbine section of FIG. 1 showing that the turbine section includes a turbine assembly coupled to a source of cooling air and a turbine shroud that extends around blades of a turbine stage and resists gasses from passing the blades without interaction with the blades, and that the turbine shroud has a carrier segment fluidly coupled to the source of cooling air and a ceramic matrix composite blade track segment coupled to the carrier segment.

Referring now to FIG. 2, the turbine 16 illustratively includes a turbine wheel assembly 22 and a turbine shroud 24. The turbine wheel assembly 22 has blades 26 that are pushed by the combustion products (i.e., hot, high-pressure gasses) from the combustor 14 to cause the assembly 22 to rotate about a central axis 28. The turbine shroud 24 extends around the blades 26 and resists gasses from passing the blades 26 without interaction with the blades 26 (i.e., without pushing the blades 26 to cause the assembly 22 to rotate). Combustion products that are allowed to pass over the blades 26 do not push the blades 26, and such passed-over products contribute to lost performance within the engine 10.

An illustrative turbine assembly 30 adapted for use in the turbine 16 includes the turbine shroud 24, which is coupled to a source of cooling air 32, as shown in FIG. 2. The source of cooling air 32 is configured to provide cooling air to the turbine shroud 24 to cool the turbine shroud 24 during operation of the turbine assembly 30. In some embodiments, the source of cooling air 32 may be embodied as, or otherwise include, a stream of pressurized bypass air that is passed around the compressor 12, the combustor 14, and the turbine 16 during operation of the assembly 30. In other embodiments, the source of cooling air 32 may be embodied as, or otherwise include, the compressor 12 and/or another suitable cooling air source.

The turbine shroud 24 illustratively includes a carrier 34 fluidly coupled to the source of cooling air 32 and a blade track 44 coupled to the carrier 34 as shown in FIG. 2. The carrier 34 is configured to couple to the case 18 and includes carrier segments 36 that are circumferentially arranged around the central axis 28 to form the carrier 34. The blade track 44 is configured to at least partially shield the carrier 34 from gasses passed along a gas path GP defined in part by the blade track 44. As such, the blade track 44 may be referred to as a heat shield 44. The blade track 44 includes blade track segments 46 that are circumferentially arranged around the central axis 28 to form the blade track 44.

Each of the illustrative carrier segments 36 includes metallic materials as shown in FIG. 2. Each of the carrier segments 36 includes a main body 38 and brackets 40 interconnected with and extending inward in a radial direction indicated by arrow R from the main body 38 relative to the central axis 28. The brackets 40 are illustratively L-shaped when viewed circumferentially around the axis 28. The brackets 40 have cooling air passageways 42 that are configured to conduct cooling air provided by the source of cooling air 32 therethrough to cool the carrier segment 36 during operation of the turbine assembly 30. As such, the turbine assembly 30 may be said to provide active cooling of the carrier 34.

Figure 3:
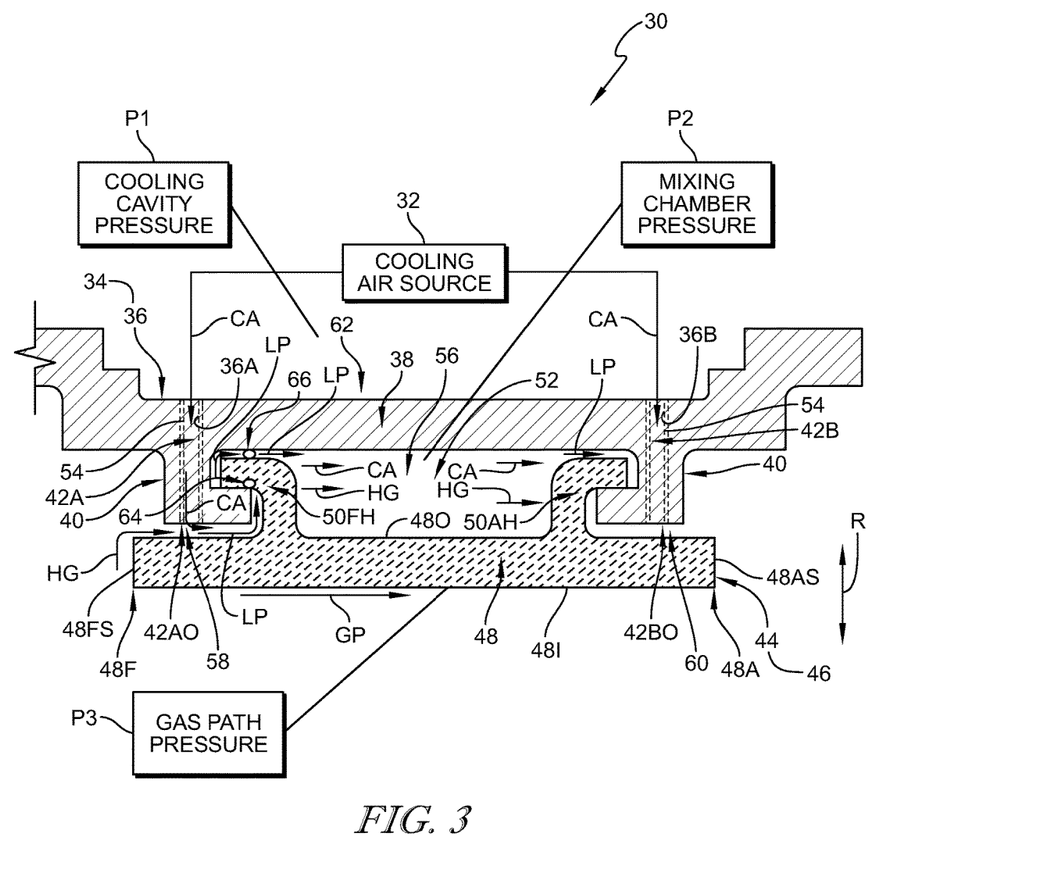
FIG. 3 is a detail view of the turbine assembly of FIG. 2 showing that the carrier segment includes cooling air passageways configured to conduct cooling air from the source of cooling air therethrough and shaped to discharge the cooling air along a leak path that leads into at least one mixing chamber defined radially between the carrier segment and the blade track segment to mix the cooling air with relatively hot gasses migrating radially outward from a gas path during operation of the turbine assembly.

Each of the illustrative blade track segments 46 includes ceramic matrix composite materials as suggested in FIG. 3. Each of the blade track segments 46 includes a runner 48 and hangers 50 interconnected with and extending radially outward from the runner 48 relative to the central axis 28 as shown in FIG. 2. The runner 48 has a radially-innermost surface 48I that defines in part the gas path GP. The hangers 50 are L-shaped when viewed circumferentially about the axis 28 and are engaged with the brackets 40 of the carrier segment 36 as shown in FIG. 2 during operation of the turbine assembly 30.

Referring now to FIG. 3, a radially-outermost surface 48O of the runner 48 of each blade track segment 46, the hangers 50 of each segment 46, and the main body 38 of each carrier segment 36 cooperatively define a mixing chamber 52. The cooling air passageways 42 are fluidly coupled to, and shaped to discharge cooling air indicated by arrow CA along, leak path LP into the mixing chamber 52 during operation of the turbine assembly 30. The mixing chamber 52 is configured to receive relatively hot gasses indicated by arrow HG that migrate radially outward from the gas path GP along the leak path LP during operation of the turbine assembly 30. The leak path LP extends radially outward from the gas path GP between the carrier and blade track segments 36, 46 into the mixing chamber 52. During operation of the turbine assembly 30, cooling air CA discharged by the passageways 42 along the leak path LP into the mixing chamber 52 is mixed with the gasses HG migrating radially outward from the gas path GP.

The cooling air passageways 42 include at least two cooling air passageways 42A, 42B that extend through the brackets 40 of each carrier segment 36 and are axially spaced apart from one another as shown in FIG. 3. In the illustrative embodiment, an environmental barrier coating 54 is applied to surfaces 36A, 36B of each carrier segment 36 respectively defining the cooling air passageways 42A, 42B. In other embodiments, however, no coating may be applied to the surfaces 36A, 36B.

Each cooling air passageway 42A is illustratively embodied as, or otherwise includes, one or multiple passageways circumferentially spaced from one another about the central axis 28 that is/are shaped to discharge cooling air CA along the leak path LP through one or more orifices 42AO as shown in FIG. 3. Each cooling air passageway 42B is illustratively embodied as, or otherwise includes, one or multiple passageways circumferentially spaced from one another about the central axis 28 that is/are shaped to discharge cooling air CA along the leak path LP through one or more orifices 42BO.

The orifices 42AO, 42BO are illustratively axially spaced apart from one another as shown in FIG. 3. The one or more orifices 42AO are each located adjacent a forward end 48F of the runner 48 of each blade track segment 46 and axially between a forward-most surface 48FS of the runner 48 and a forward-most hanger 50FH of each segment 46. The one or more orifices 42BO are located adjacent an aft end 48A of the runner 48 of each blade track segment 46 and axially between an aft-most surface 48AS of the runner 48 and an aft-most hanger 50AH of each segment 46.

The one or more orifices 42AO are illustratively located axially forward of the mixing chamber 52 as shown in FIG. 3. The one or more orifices 42BO are illustratively located axially aft of the mixing chamber 52. As such, the orifices 42AO, 42BO are axially spaced from a channel 56 defined between the hangers 50FH, 50AH of each blade track segment 46.

Cooling air CA discharged by the cooling air passageway 42A through the one or more orifices 42AO may mix with gasses HG migrating by design radially outward from the gas path GP axially forward of the mixing chamber 52 during operation of the turbine assembly 30 as shown in FIG. 3. Cooling air CA discharged by the cooling air passageway 42B through the one or more orifices 42BO may mix with gasses HG migrating radially outward from the gas path GP axially aft of the mixing chamber 52 during operation of the turbine assembly 30.

In some embodiments, regions 58, 60 respectively axially forward and aft of the mixing chamber 52, where cooling air CA is mixed with gasses HG, may provide secondary mixing chambers as shown in FIG. 3. In such embodiments, the mixing chamber 52 may be referred to as a primary mixing chamber 52. Additionally, in such embodiments, the turbine assembly 30 may provide three mixing chambers (i.e., the primary mixing chamber 52 and the secondary mixing chambers provided by the regions 58, 60).

In the illustrative embodiment, cooling air CA is provided to the cooling air passageways 42 by a cooling cavity 62 located radially outward of the main body 38 of the carrier segment 36 as shown in FIG. 3. In some embodiments, the cooling cavity 62 may be defined between each of the carrier segments 36 and the case 18. In any case, the source of cooling air 32 is configured to provide cooling air CA to the cooling cavity 62 such that the cavity 62 is pressurized to a pressure P1 during operation of the turbine assembly 30.

In the illustrative embodiment, the source of cooling air 32 is configured to provide cooling air CA to the mixing chamber 52 such that the mixing chamber 52 is pressurized to a pressure P2 during operation of the turbine assembly 30 as shown in FIG. 3. The pressure P2 is illustratively not greater than the pressure P1 or a pressure P3 of the relatively hot gasses HG passed along the gas path GP during operation of the assembly 30. In some embodiments, the pressure P2 may be generally or substantially equal to the pressure P3 and less than the pressure P1.

In the illustrative embodiment, pressurization of the cooling cavity 62 to the pressure P1 is required to pressurize the mixing chamber 52 to the pressure P2. Additionally, pressurization of the cooling cavity 62 to the pressure P1 resists ingress of relatively hot gasses HG into the cooling cavity 62. To maintain pressurization of the cooling cavity 62 to the pressure P1, one or more seals (not shown) may be employed to seal off the cooling cavity 62 from the gas path GP and/or the leak path LP.

In the illustrative embodiment, pressurization of the mixing chamber 52 to the pressure P2 does not generally resist migration of gasses HG along the leak path LP into the mixing chamber 52 during operation of the turbine assembly 30. As such, the turbine assembly 30 does not employ sealing components to maintain pressurization of the mixing chamber 52 to a pressure greater than the pressure P2 to prevent ingress of gasses HG into the chamber 52. Put differently, no sealing components are arranged between the carrier and blade track segments 36, 46 to seal the mixing chamber 52 as shown in FIG. 3.

The turbine assembly 30 illustratively includes at least one optional flow discourager 64 arranged between the carrier and blade track segments 36, 46 as shown in FIG. 3. More specifically, the at least one flow discourager 64 is positioned between the bracket 40 of the segment 36 and the forward-most hanger 50FH of the segment 46. The flow discourager 64 is configured to control flow of the gasses HG, CA along the leak path LP between the segments 36, 46 during operation of the turbine assembly 30. In other embodiments, no flow discourager or seal is included to encourage flow along the leak path LP.

The turbine assembly 30 illustratively includes locating pads 66 arranged between the carrier and blade track segments 36, 46 as shown in FIG. 3. More specifically, three locating pads 66 are positioned between the main body 38 of the segment 36 and the forward-most hanger 50FH of the segment 46. The locating pads 66 provide radially outer-most surfaces of the segment 36 and are configured to locate the carrier segment 36 relative to the blade track segment 46 during operation of the turbine assembly 30.

Referring still to FIG. 3, the illustrative turbine assembly 30 may provide a number of benefits. Those benefits are described in greater detail below with reference to the operation of the turbine assembly 30.

Exposure to heat during operation of the turbine assembly 30 may cause the temperature of each of the carrier segments 36 to approach, or even exceed, the operational limit of the segment 36. Each carrier segment 36 may be exposed to heat from the relatively hot gasses HG migrating radially outward from the gas path GP along the leak path LP. Additionally, each carrier segment 36 may be exposed to heat from gasses migrating radially outward from the gas path GP between circumferentially adjacent blade track segments 46 (such migration may be said to be through split lines defined by the adjacent segments 46). Conduction of cooling air CA from the source of cooling air 32 through the passageways 42A, 42B during operation of the assembly 30 reduces the temperature of each segment 36. As a result, active cooling of each segment 36 counteracts exposure of the segment 36 to heat from the gasses HG and from the gasses migrating through the split lines defined by the blade track segments 46.

Exposure to heat during operation of the turbine assembly 30 may cause the temperature of each of the blade track segments 46 to approach, or even exceed, the operational limit of the segment 46. Each blade track segment 46 may be exposed to heat from gasses passed along the gas path GP, gasses HG migrating radially outward from the gas path GP along the leak path LP, and/or gasses migrating through the split lines defined by adjacent segments 46. Discharge of cooling air CA by the cooling air passageways 42A, 42B along the leak path LP into the mixing chamber 52 during operation of the assembly 30 counteracts exposure of the segment 46 to heat from the aforementioned sources in several ways. First, cooling air CA discharged by the passageways 42A, 42B may impinge directly on the blade track segment 46 to reduce the temperature of the segment 46 and counteract the heat exposure. Second, mixture of the cooling air CA discharged by the passageways 42A, 42B with the gasses HG in the mixing chamber 52 lowers the temperature of the gasses HG and thereby reduces exposure of the segment 46 to heat from the gasses HG.

The locations where cooling air CA is discharged by the cooling air passageways 42A, 42B may affect exposure of each of the carrier and blade track segments 36, 46 to heat from any of the sources discussed above during operation of the turbine assembly 30. Using the passageway 42A as an example, the largest amount of exposure of the segments 36, 46 to heat along the central axis 28 may occur adjacent the forward end 48F of the segment 36. Because cooling air CA is discharged by the passageway 42A through the orifice 42AO adjacent the end 48F during operation of the assembly 30, discharge of cooling air CA through the orifice 42AO at that location may counteract the large heat exposure.

Pressurization of the mixing chamber 52 may cause each blade track segment 46 to experience loads during operation of the turbine assembly 30. The mixing chamber 52 is pressurized to the pressure P2 during operation of the assembly 30 as discussed above to permit cooling air CA to mix with the gasses HG in the chamber 52. As such, pressurization of the chamber 52 to resist or prevent ingress of gasses HG into the chamber 52 is not required. As a result, each blade track segment 46 avoids direct exposure to pressure loads that the segment 46 would otherwise experience were the mixing chamber 52 pressurized to prevent ingress of the gasses HG into the chamber 52. Additionally, because the chamber 52 need not be sealed to maintain pressurization of the chamber 52 to prevent ingress of the gasses HG, no sealing components are arranged between the carrier and blade track segments 36, 46. Omission of those sealing components may consequently decrease the complexity of the turbine assembly 30 compared to other configurations that include sealing components.

Figure 4:
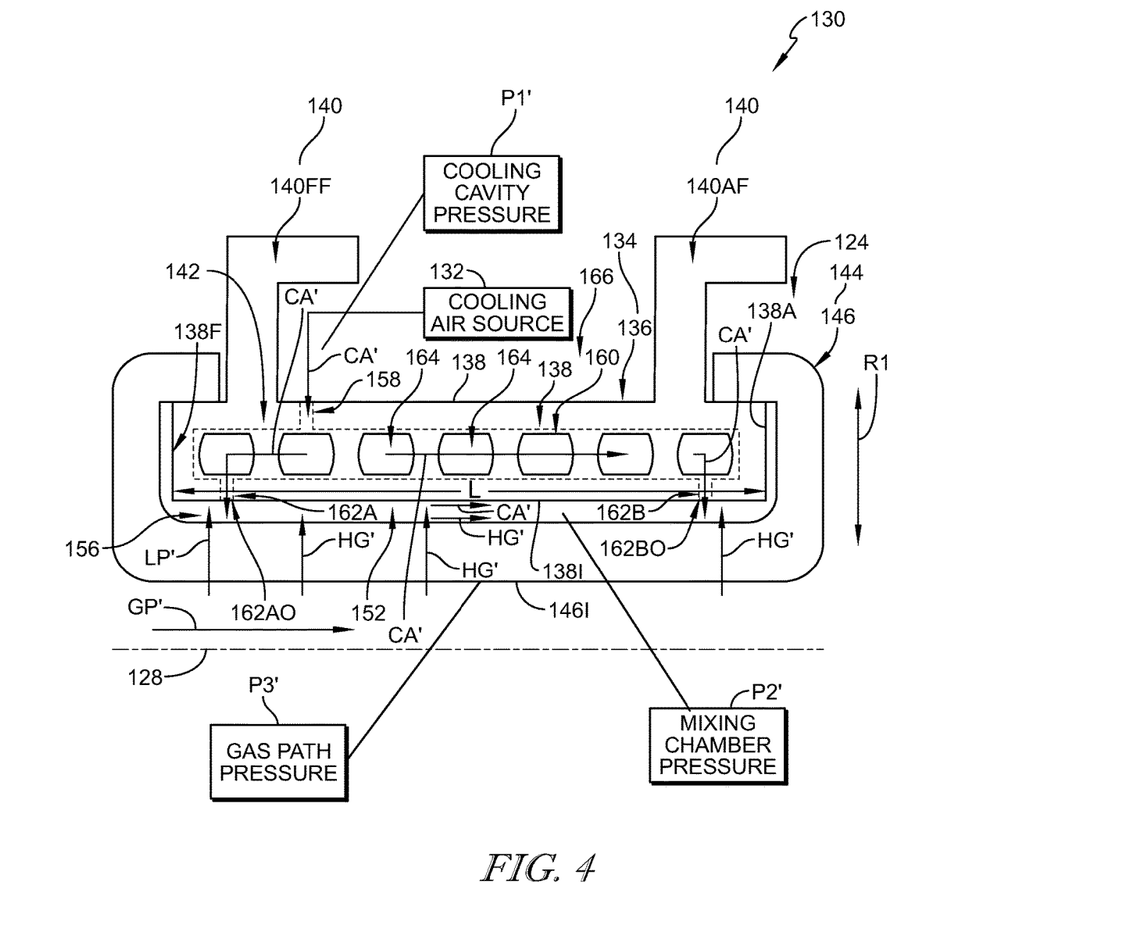

Referring now to FIG. 4, another illustrative turbine assembly 130 adapted for use in the turbine 16 of the gas turbine engine 10 is shown. The turbine assembly 130 includes a turbine shroud 124. A source of cooling air 132 is fluidly coupled to the turbine shroud 124 and configured to provide cooling air thereto to cool the turbine shroud 124 during operation of the turbine assembly 130. In some embodiments, the source of cooling air 132 may be embodied as, or otherwise include, a stream of pressurized bypass air. In other embodiments, the source of cooling air 132 may be embodied as, or otherwise include, the compressor 12 and/or another suitable cooling air source.

The turbine shroud 124 illustratively includes a carrier 134 fluidly coupled to the source of cooling air 132 and a blade track 144 coupled to the carrier 134 as shown in FIG. 4. The carrier 134 includes carrier segments 136 that are circumferentially arranged around a central axis 128 to form the carrier 134. The blade track 144 is configured to at least partially shield the carrier 134 from gasses passed along a gas path GP' defined in part by the blade track 144. As such, the blade track 144 may be referred to as a heat shield 144. The blade track 144 includes blade track segments 146 that are circumferentially arranged around the central axis 128 to form the blade track 144.

Each of the illustrative carrier segments 136 includes metallic materials. Each of the carrier segments 136 includes a main body 138 having a T-shaped cross section and flanges 140 interconnected with and extending outward in a radial direction indicated by arrow R1 from the main body 138 relative to the central axis 128. In some embodiments, the flanges 140 may be configured to couple to the case 18. The main body 138 has at least one cooling air passageway 142 that is configured to conduct cooling air provided by the source of cooling air 132 therethrough to cool the carrier segment 136 during operation of the turbine assembly 130. As such, the turbine assembly 130 may be said to provide active cooling of the carrier 134.

Each of the illustrative blade track segments 146 includes ceramic matrix composite materials. Each of the blade track segments 146 has a C-shaped cross section and defines a channel 156. The blade track segment 146 has a radially-innermost surface 146I that defines in part the gas path GP'. The blade track segment 146 is engaged with the main body 138 of the carrier segment 136 such that the main body 138 is received by the channel 156 during operation of the turbine assembly 130.

The main body 138 of each carrier segment 136 and each blade track segment 146 illustratively define only one mixing chamber 152 in the channel 156 as shown in FIG. 4. The at least one cooling air passageway 142 is fluidly coupled to, and shaped to discharge cooling air indicated by arrow CA' into, the mixing chamber 152 during operation of the turbine assembly 130. The mixing chamber 152 is configured to receive relatively hot gasses indicated by arrow HG' that migrate radially outward from the gas path GP' along a leak path LP' during operation of the turbine assembly 130. The leak path LP' extends radially outward from the gas path GP' between the carrier and blade track segments 136, 146 into the mixing chamber 152. During operation of the turbine assembly 130, cooling air CA' discharged by the at least one passageway 142 into the mixing chamber 152 is mixed with the gasses HG' migrating radially outward from the gas path GP' along the leak path LP' circumferentially between carrier segments 136.

The main body 138 of each carrier segment 136 illustratively includes an inner surface 138I and an outer surface 138O arranged opposite the inner surface 138I as shown in FIG. 4. The inner surface 138I is located radially inward of the outer surface 138O relative to the central axis 128. The inner surface 138I cooperates with the blade track segment 146 to define the mixing chamber 152. The outer surface 138O is interconnected with the flanges 140 and engaged with the blade track segment 146 during operation of the turbine assembly 130.

The main body 138 of each carrier segment 136 illustratively includes at least one input port 158 and a plenum 160 as shown in FIG. 4. The at least one input port 158 extends through the outer surface 138O to the plenum 160 to fluidly couple the surface 138O to the plenum 160. The at least one input port 158 is configured to conduct cooling air CA' provided thereto by the source of cooling air 132 to the plenum 160 during operation of the turbine assembly 130. The plenum 160 is defined between the outer and inner surfaces 138O, 138I and extends over most of an axial length L of the main body 138 measured between forward and aft ends 138F, 138A thereof. The plenum 160 is configured to distribute cooling air CA' conducted thereto by the at least one input port 158 along the length L of the main body 138 during operation of the turbine assembly 130.

The main body 138 of each carrier segment 136 illustratively includes output ports 162 and blocking ports 164 as shown in FIG. 4. The output ports 162 extend through the inner surface 138I to the plenum 160 to fluidly couple the surface 138I to the plenum 160. The output ports 162 are spaced apart along the central axis 128 and configured to discharge cooling air CA' provided thereto by the plenum 160 into the mixing chamber 152. The blocking ports 164 extend through the plenum 160 and are spaced apart along the central axis 128. The blocking ports 164 are configured to receive plugs, rods, or the like to selectively resist cooling air CA' from being distributed along the length L of the main body 138 by the plenum 160 during operation of the turbine assembly 130.

The output ports 162 illustratively include at least two output ports 162A, 162B as shown in FIG. 4. Each output port 162A is illustratively embodied as, or otherwise includes, one or multiple output ports circumferentially spaced from one another about the central axis 128 that is/are shaped to discharge cooling air CA' through one or more orifices 162AO. Each output port 162B is illustratively embodied as, or otherwise includes, one or multiple output ports circumferentially spaced from one another about the central axis 128 that is/are shaped to discharge cooling air CA' through one or more orifices 162BO.

The one or more orifices 162AO are illustratively each located adjacent the forward end 138F of the main body 138 as shown in FIG. 4. The one or more orifices 162AO are located forward of, or in substantially the same place as, a forward-most flange 140FF of each carrier segment 136 along the central axis 128.

The one or more orifices 162BO are illustratively each located adjacent the aft end 138A of the main body 138 as shown in FIG. 4. The one or more orifices 162BO are located aft of, or in substantially the same place as, an aft-most flange 140AF of each carrier segment 136 along the central axis 128.

Cooling air CA' discharged by each output port 162A through the one or more orifices 162AO may mix in the mixing chamber 152 with gasses HG' migrating radially outward from the gas path GP' along the leak path LP' during operation of the turbine assembly 130 as shown in FIG. 4. Cooling air CA' discharged by each output port 162B through the one or more orifices 162BO may mix in the chamber 152 with gasses HG' migrating radially outward from the gas path GP' along the leak path LP' during operation of the turbine assembly 130.

In the illustrative embodiment, cooling air CA' is provided to the at least one input port 158 by a cooling cavity 166 located radially outward of the main body 138 of the carrier segment 136 as shown in FIG. 4. In some embodiments, the cooling cavity 166 may be defined between each of the carrier segments 136 and the case 18. In any case, the source of cooling air 132 is configured to provide cooling air CA' to the cooling cavity 166 such that the cavity 166 is pressurized to a pressure P1' during operation of the turbine assembly 130.

In the illustrative embodiment, the source of cooling air 132 is configured to provide cooling air CA' to the mixing chamber 152 such that the mixing chamber 152 is pressurized to a pressure P2' during operation of the turbine assembly 130 as shown in FIG. 4. The pressure P2' is illustratively not greater than the pressure P1' or a pressure P3' of the relatively hot gasses HG' passed along the gas path GP' during operation of the assembly 130. In some embodiments, the pressure P2' may be generally or substantially equal to the pressure P3' and less than the pressure P1'.

In the illustrative embodiment, pressurization of the cooling cavity 166 to the pressure P1' is required to pressurize the mixing chamber 152 to the pressure P2'. Additionally, pressurization of the cooling cavity 166 to the pressure P1' resists ingress of relatively hot gasses HG' into the cooling cavity 166. To maintain pressurization of the cooling cavity 166 to the pressure P1', one or more seals (not shown) may be employed to seal off the cooling cavity 166 from the gas path GP' and/or the leak path LP'.

In the illustrative embodiment, pressurization of the mixing chamber 152 to the pressure P2' does not generally resist migration of gasses HG' along the leak path LP' into the mixing chamber 152 during operation of the turbine assembly 130. As such, the turbine assembly 130 does not employ sealing components to maintain pressurization of the mixing chamber 152 to a pressure greater than the pressure P2' to prevent ingress of gasses HG' into the chamber 152. Put differently, no sealing components are arranged between the carrier and blade track segments 136, 146 to seal the mixing chamber 152 as shown in FIG. 4.

Referring still to FIG. 4, the illustrative turbine assembly 130 may provide a number of benefits. Those benefits are described in greater detail below with reference to the operation of the turbine assembly 130.

Exposure to heat during operation of the turbine assembly 130 may cause the temperature of each of the carrier segments 136 to approach, or even exceed, the operational limit of the segment 136. Each carrier segment 136 may be exposed to heat from the relatively hot gasses HG' migrating radially outward from the gas path GP' along the leak path LP'. Additionally, each carrier segment 136 may be exposed to heat from gasses migrating radially outward from the gas path GP' between circumferentially adjacent blade track segments 146 (such migration may be said to be through split lines defined by the adjacent segments 146). Conduction of cooling air CA' from the source of cooling air 132 through the at least one input port 158, the plenum 160, and the output ports 162A, 162B during operation of the assembly 130 reduces the temperature of each segment 136. In that way, the at least one input port 158, the plenum 160, and at least one the output ports 162A, 162B cooperatively provide the at least one cooling air passageway 142 that actively cools the segment 136. Active cooling of each segment 136 counteracts exposure of the segment 136 to heat from the gasses HG' and from the gasses migrating through the split lines defined by the blade track segments 146.

Exposure to heat during operation of the turbine assembly 130 may cause the temperature of each of the blade track segments 146 to approach, or even exceed, the operational limit of the segment 146. Each blade track segment 146 may be exposed to heat from gasses passed along the gas path GP', gasses HG' migrating radially outward from the gas path GP' along the leak path LP', and/or gasses migrating through the split lines defined by adjacent segments 146. Discharge of cooling air CA' by the components cooperatively providing the at least one cooling air passageway 142 into the mixing chamber 152 during operation of the assembly 130 counteracts exposure of the segment 146 to heat from the aforementioned sources in several ways. First, cooling air CA' discharged into the mixing chamber 152 may impinge directly on the blade track segment 146 to reduce the temperature of the segment 146 and counteract the heat exposure. Second, mixture of the cooling air CA' with the gasses HG' in the mixing chamber 152 lowers the temperature of the gasses HG' and thereby reduces exposure of the segment 146 to heat from the gasses HG'.

The locations where cooling air CA' is discharged into the mixing chamber 152 may affect exposure of each of the carrier and blade track segments 136, 146 to heat from any of the sources discussed above during operation of the turbine assembly 130. The largest amount of exposure of the segments 136, 146 to heat along the central axis 128 may occur adjacent the forward end 138F of the main body 138. Because cooling air CA' is discharged through the orifice 162AO adjacent the end 138F during operation of the assembly 130, discharge of cooling air CA' through the orifice 162AO at that location may counteract the large heat exposure.

Pressurization of the mixing chamber 152 may cause each blade track segment 146 to experience loads during operation of the turbine assembly 130. The mixing chamber 152 is pressurized to the pressure P2' during operation of the assembly 130 as discussed above to permit cooling air CA' to mix with the gasses HG' in the chamber 152. As such, pressurization of the chamber 152 to resist or prevent ingress of gasses HG' into the chamber 152 is not required. As a result, each blade track segment 146 avoids direct exposure to pressure loads that the segment 146 would otherwise experience were the mixing chamber 152 pressurized to prevent ingress of the gasses HG' into the chamber 152. Additionally, because the chamber 152 need not be sealed to maintain pressurization of the chamber 152 to prevent ingress of the gasses HG', no sealing components are arranged between the carrier and blade track segments 136, 146. Omission of those sealing components may consequently decrease the complexity of the turbine assembly 130 compared to other configurations that include sealing components.

The present disclosure may provide a turbine assembly (e.g., the turbine assemblies 30, 130) including a component having ceramic matrix composite (CMC) materials (e.g., the blade tracks 44, 144) and a component having metallic materials (e.g., the carriers 34, 134). The turbine assemblies may be intended for use in applications where metallic components require some amount of active cooling.

The turbine assemblies of the present disclosure may employ the CMC component as a semi-cooled heat shield to shield the metallic component from exposure to high temperature gasses (e.g., HG, HG') passed along a gas path (e.g., GP, GP'). Additionally, the CMC heat shield may shield the metallic component from the high convective coefficients, and the associated heat transfer amounts, present during use of a turbine shroud (e.g., the turbine shrouds 24, 124).

One benefit of the turbine assemblies of the present disclosure may be the cooling savings achieved during operation of the assemblies by leveraging the higher temperature (i.e., relative to the temperature limits of the metallic component) limits of the CMC component. The cooling savings may enable the amount of cooling air supplied to the turbine (e.g., the turbine 16) to be reduced. As such, specific fuel consumption of the gas turbine engine (e.g., the engine 10) may be reduced.

One turbine assembly (e.g., the assembly 30) may include a segmented carrier (e.g., the carrier 34) that has outer features or hangers for radial (e.g., in the direction R) positioning within a cylindrical turbine case (e.g., the case 18) and an inner feature or bracket (e.g., the bracket 40) for radially supporting a segmented CMC heat shield (e.g., the blade track 44). The CMC heat shield (e.g., the surface 48I) may form the outer boundary of the gas path (e.g., the gas path GP) and interface radially with a tip of a turbine blade row (e.g., the turbine wheel assembly 22). The one turbine assembly may be shown in FIG. 3, whereas another turbine assembly (e.g., the assembly 130) may be shown in FIG. 4.

Some heat exposure may occur on the portion of the CMC heat shield exposed to the gas path gasses during operation of the one turbine assembly. In some applications, the operating temperatures of the metallic component may exceed the temperature limits of that component. In such applications, the operating temperatures of the metallic component may be limited through backside cooling (e.g., by the cooling cavity 62) of the main body (e.g., the main body 38) of the carrier. Venting of that cooling air (e.g., cooling air CA) may be achieved by holes (e.g., the cooling air passageways 42) that pass through the inner feature, and the operating temperatures of the inner feature may therefore be limited. Coatings (e.g., the coating 54) may be employed to improve durability of the metallic component and provide supplemental insulating properties as needed. Some heat exposure may occur as the result of convection from gas path air migrating through the non-sealed split lines between the CMC shield segments (e.g., the segments 46).

In some applications, the operating temperatures of the CMC heat shield may exceed the temperature limits of that component. In such applications, cooling air vented from the carrier may be used to impinge upon the backside (e.g., the surface 48O) of the CMC heat shield and to dilute hot gasses (e.g., gasses HG) entrained into the turbine assembly. Impingement upon the CMC heat shield and dilution may occur in multiple mixing cavities (e.g., the mixing chamber 52 and the regions 58, 60).

In the one turbine assembly, three mixing cavities (e.g., the areas 52, 58, 60) may be provided. In the another turbine assembly, only one mixing cavity (e.g., the mixing chamber 152) may be provided.

Reducing or minimizing the volume of each mixing cavity may limit the amount of hot gasses that accumulate in the cavity. Such reduction or minimization may be beneficial in high temperature applications, as well as shroudless turbine blade applications.

In shroudless turbine blade applications, there may be a pumping effect that drives hot gas radially outward. While some axial movement of hot gas may occur along split lines, due to the axial pressure drop across the turbine stage, the pumping effect may lead to a localized impingement of hot gas as a blade passes a CMC split line. The pumping effect may cause a significant amount of heat to accumulate within the carrier. As such, reducing or minimizing the volume of the central mixing cavity (e.g., the chamber 52), along with providing vent holes (e.g., orifices 42AO) at, or just upstream of, the blade interface (e.g., adjacent the end 48F) may optimally limit the accumulation of hot gasses within the turbine assembly.

The turbine assemblies of the present disclosure may be scaled based on multiple factors. In one example, the turbine assemblies may be scaled based on the evolving capabilities of the CMC materials of the CMC component. In another example, the turbine assemblies may be scaled based on the needs of a particular customer.

The turbine assemblies of the present disclosure may obviate the need for an ingress-free cavity between the CMC heat shield and the carrier. Providing an ingress-free cavity without pressurizing the CMC heat shield above its mechanical stress limit may be one concern. Providing an ingress-free cavity while actively cooling the carrier may also be another concern. Designs providing sealing mechanisms for sealing the ingress-free cavity may not address these concerns. Additionally, such designs may be associated with undesirable cost, complexity, and risk.

The turbine assemblies of the present disclosure may address the aforementioned concerns by, among other things, providing an actively cooled metallic carrier (e.g., the carriers 34, 134). In these turbine assemblies, it may be desirable to avoid ingress into the pressurized cavity (e.g., the cavities 62, 166) located radially outward of the carrier. Ingress into these cavities may be avoided using legacy strip seal arrangements, for example.

The turbine assemblies of the present disclosure may employ no sealing components that interface with the CMC heat shield. As such, the assemblies may permit some amount of hot gas to leak into the assembly, such as between end faces of the CMC segments or around the inner feature of the carrier. The present designs may compensate for such leakages by providing flows of cooling air through the carrier to achieve a dilution/mixing effect.

The total amount of cooling air used by the presently disclosed seal-free designs may be less than the amount of cooling air used for conventional, all-metallic, actively-cooled segment designs because direct exposure of the carrier to hot gasses from the gas path may be reduced in the present designs compared to the conventional designs. Put another way, the present designs may reduce the convective coefficients on the inner side of the carrier as a result of shielding by the CMC heat shield, mitigate heat accumulation by targeted cooling, and reduce the temperature increase through directed cooling of the carrier and dilution of the entrained hot gasses. Consequently, the turbine assemblies of the present disclosure may provide cooling savings. The cooling savings may be dependent upon the engine application and the capabilities of the CMC material.

The presently disclosed turbine assemblies may include flexible or inflexible flow discouragers (e.g., flow discouragers 64). The flow discouragers are not employed to form a pressurized cavity. Rather, the flow discouragers may be intended to generally limit the tendency for, and improve the predictability of, hot gas departing the flow-path and migrating within the assembly. The in-service reliability of the flow discouragers may adequately compensate for cooling flow reductions accompanying the use of the flow discouragers.

As long as the flow discouragers remain intact, they may provide some initial performance and durability enhancements.

Mechanical forces for seal segments may be generated by varying pressures around the assembled segments. In such situations, the highest pressure may be located within the outboard cooling cavity (e.g., the cavities 62, 166) and the lowest pressure may be located at the aft end (e.g., the end 48A) of the CMC heat shield. As a result, loads may force the carrier and the CMC shield radially inward and axially aft. The turbine assemblies of the present disclosure may provide specifically minimized or decreased pressure loading on the CMC heat shield.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly for a gas turbine engine, the turbine assembly comprising
    a source of cooling air, and
    a turbine shroud configured to extend around blades of a turbine stage and resist gasses from passing the blades without interaction with the blades, the turbine shroud including
        a carrier segment comprising metallic materials, the carrier segment fluidly coupled to the source of cooling air, the carrier segment formed to include a plurality of cooling air passageways configured to conduct cooling air provided by the source of cooling air therethrough to cool the carrier segment during operation of the turbine assembly, and
        a blade track segment comprising ceramic matrix composite materials and coupled to the carrier segment,
    wherein the plurality of cooling air passageways are shaped to discharge cooling air along a leak path into at least one mixing chamber defined between the carrier segment and the blade track segment to mix the cooling air with hot gasses migrating radially outward from a gas path during operation of the turbine assembly, the leak path extends from the gas path between the carrier segment and the blade track segment into the at least one mixing chamber, and the gas path is defined in part by a radially-innermost surface of the blade track segment.

2. The turbine assembly of claim 1, wherein the source of cooling air is configured to provide cooling air to the at least one mixing chamber such that the at least one mixing chamber is pressurized to a first pressure not greater than a second pressure defined by the hot gasses passed along the gas path during operation of the turbine assembly.

3. The turbine assembly of claim 2, wherein the first pressure is generally equal to the second pressure.

4. The turbine assembly of claim 1, wherein no sealing components are arranged between the carrier segment and the blade track segment.

5. The turbine assembly of claim 1, wherein an environmental barrier coating is applied to the plurality of cooling air passageways.

6. The turbine assembly of claim 1, wherein at least one of the plurality of cooling air passageways is shaped to discharge cooling air along the leak path through an orifice at a location adjacent to a forward end of the blade track segment and the at least one mixing chamber is arranged aft of the orifice.

7. The turbine assembly of claim 6, wherein the carrier segment includes a main body and brackets extending radially inward from the main body and formed to include the at least one of the plurality of cooling air passageways, the blade track segment includes a runner and hangers extending radially outward from the runner and engaged with the brackets, and the orifice is located axially between a forward-most hanger of the blade track segment and a forward-most surface of the runner.

8. The turbine assembly of claim 7, wherein the orifice is spaced along a central axis from a channel defined between the hangers of the blade track segment.

9. The turbine assembly of claim 7, comprising a first flow discourager positioned between the brackets of the carrier segment and the forward-most hanger of the blade track segment to control migration of the hot gasses from the gas path between the carrier segment and the blade track segment along the leak path during operation of the turbine assembly.

10. The turbine assembly of claim 9, comprising at least one locating pad positioned between the forward-most hanger of the blade track segment and the main body of the carrier segment to locate the carrier segment relative to the blade track segment during operation of the turbine assembly.

11. A turbine assembly for a gas turbine engine, the turbine assembly comprising
    a source of cooling air, and
    a turbine shroud configured to extend around blades of a turbine stage and resist gasses from passing the blades without interaction with the blades, the turbine shroud including
        a carrier segment comprising metallic materials, the carrier segment fluidly coupled to the source of cooling air, the carrier segment including a main body and brackets extending radially inward from the main body, the brackets having a plurality of cooling air passageways configured to conduct cooling air provided by the source of cooling air therethrough to cool the carrier segment during operation of the turbine assembly, and
        a blade track segment comprising ceramic matrix composite materials, the blade track segment including a runner having a radially-innermost surface and hangers extending radially outward from the runner that are engaged with the brackets of the carrier segment,
    wherein the plurality of cooling air passageways are shaped to discharge cooling air along a leak path into at least one mixing chamber defined between the carrier segment and the blade track segment to mix the cooling air with hot gasses migrating radially outward from a gas path during operation of the turbine assembly, the leak path extends from the gas path between the carrier segment and the blade track segment into the at least one mixing chamber, and the gas path is defined in part by the radially-innermost surface of the runner.

12. The turbine assembly of claim 11, wherein the source of cooling air is configured to provide cooling air to the at least one mixing chamber such that the at least one mixing chamber is pressurized to a first pressure not greater than a second pressure defined by the hot gasses passed along the gas path during operation of the turbine assembly.

13. The turbine assembly of claim 11, wherein the plurality of cooling air passageways includes two cooling air passageways extending through the brackets.

14. The turbine assembly of claim 13, wherein one of the plurality of cooling air passageways is shaped to discharge cooling air along the leak path through a first orifice adjacent to a forward end of the runner and the at least one mixing chamber is arranged aft of the first orifice.

15. The turbine assembly of claim 14, wherein the other of the plurality of cooling air passageways is shaped to discharge cooling air along the leak path through a second orifice adjacent to an aft end of the runner and the at least one mixing chamber is arranged forward of the second orifice.

16. A turbine assembly for a gas turbine engine, the turbine assembly comprising
a source of cooling air, and
a turbine shroud configured to extend around blades of a turbine stage and resist gasses from passing the blades without interaction with the blades, the turbine shroud including
a carrier segment comprising metallic materials, the carrier segment fluidly coupled to the source of cooling air, the carrier segment including a main body and flanges extending radially outward from the main body that are configured to couple to a case, the main body having at least one cooling air passageway configured to conduct cooling air provided by the source of cooling air therethrough to cool the carrier segment during operation of the turbine assembly, and
a blade track segment comprising ceramic matrix composite materials, the blade track segment having a C-shaped cross section and defining a channel, the blade track segment engaged with the main body of the carrier segment such that the main body is received by the channel,
wherein the at least one cooling air passageway is shaped to discharge cooling air into only one mixing chamber defined between the carrier segment and the blade track segment to mix the cooling air with hot gasses migrating radially outward from a gas path along a leak path during operation of the turbine assembly, the leak path extends from the gas path between the carrier segment and the blade track segment into the only one mixing chamber, and the gas path is defined in part by a radially-innermost surface of the blade track segment.

17. The turbine assembly of claim 16, wherein the source of cooling air is configured to provide cooling air to the only one mixing chamber such that the only one mixing chamber is pressurized to a first pressure not greater than a second pressure defined by the hot gasses passed along the gas path during operation of the turbine assembly.

18. The turbine assembly of claim 16, wherein the main body of the carrier segment has an outer surface, an inner surface arranged radially inward of the outer surface, a plenum defined between the outer and inner surfaces, at least one input port fluidly coupling the outer surface to the plenum, and a plurality of outlet ports fluidly coupling the inner surface to the plenum.

19. The turbine assembly of claim 18, wherein the at least one input port, the plenum, and at least one of the plurality of outlet ports cooperatively provide the at least one cooling air passageway.

20. The turbine assembly of claim 16, wherein the only one mixing chamber is defined in the channel between the blade track segment and the main body of the carrier segment.

* * * * *